June 1, 1926.  E. ROUČKA  1,586,705

FLUID FLOW CONTROL SYSTEM

Filed July 17, 1922    2 Sheets-Sheet 2

INVENTOR:
Erich Roučka,
BY
Everett & Rook,
ATTORNEYS.

Patented June 1, 1926.

1,586,705

UNITED STATES PATENT OFFICE.

ERICH ROUČKA, OF BLANKSO, CZECHOSLOVAKIA.

FLUID-FLOW-CONTROL SYSTEM.

Application filed July 17, 1922, Serial No. 575,752, and in Czechoslovakia October 18, 1921.

This invention relates to a system for controlling the flow of fluids for varying the fluid pressure in any device or producing motion of movable means, such for instance, as the rotor of a turbine, a piston, a diaphragm, etc.

The primary object of the invention is to provide in a system of the character described a governor for controlling, varying, or predetermining the flow of a fluid in a plurality of directions, for instance to and from a desired point or for a particular purpose, and novel and improved means for controlling the flow of fluid in all of said directions to maintain the drop in pressure produced by the operation of said governor at a certain and extremely small amount. In such a system the flow of fluid controlled by said governor is not dependent on the variable pressure of the fluid at the source or the reaction of pressure. The said certain and small drop in pressure reduces the wear, friction and reaction on the said governor and thus renders the same easy of operation and consequently quickly responsive and extremely sensitive.

Further objects of the invention are to provide in combination with a piston and cylinder device or the like to be actuated by fluid pressure and a governor valve for controlling flow of fluid to and from said piston, of fluid flow resisting means for maintaining a constant and low difference in fluid pressure at opposite sides of said governor valve with the fluid flowing either to or from said piston and cylinder device; to provide a novel and improved fluid pressure control means of the character described for utilization in a system for varying a fluid condition in accordance with another physical or chemical quantity, quality or condition, for instance rate of fluid flow, temperature, etc., and to obtain other results and advantages as may be brought out by the following description.

Figure 1:
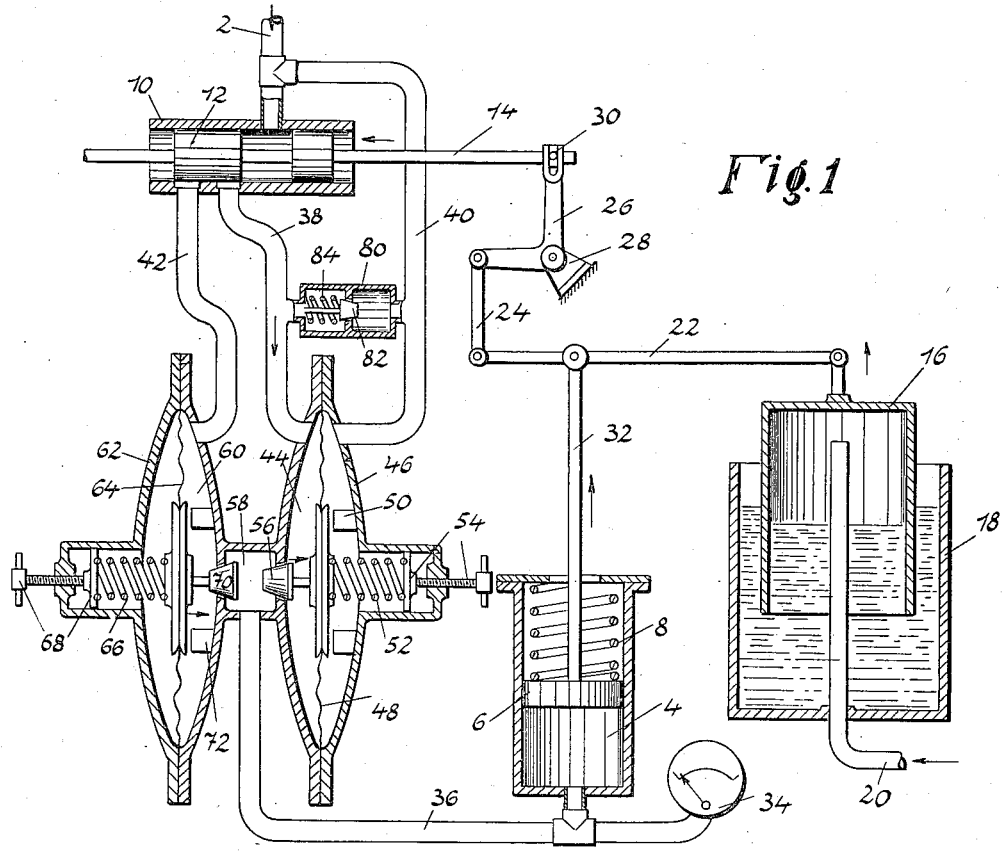
Figure 2:
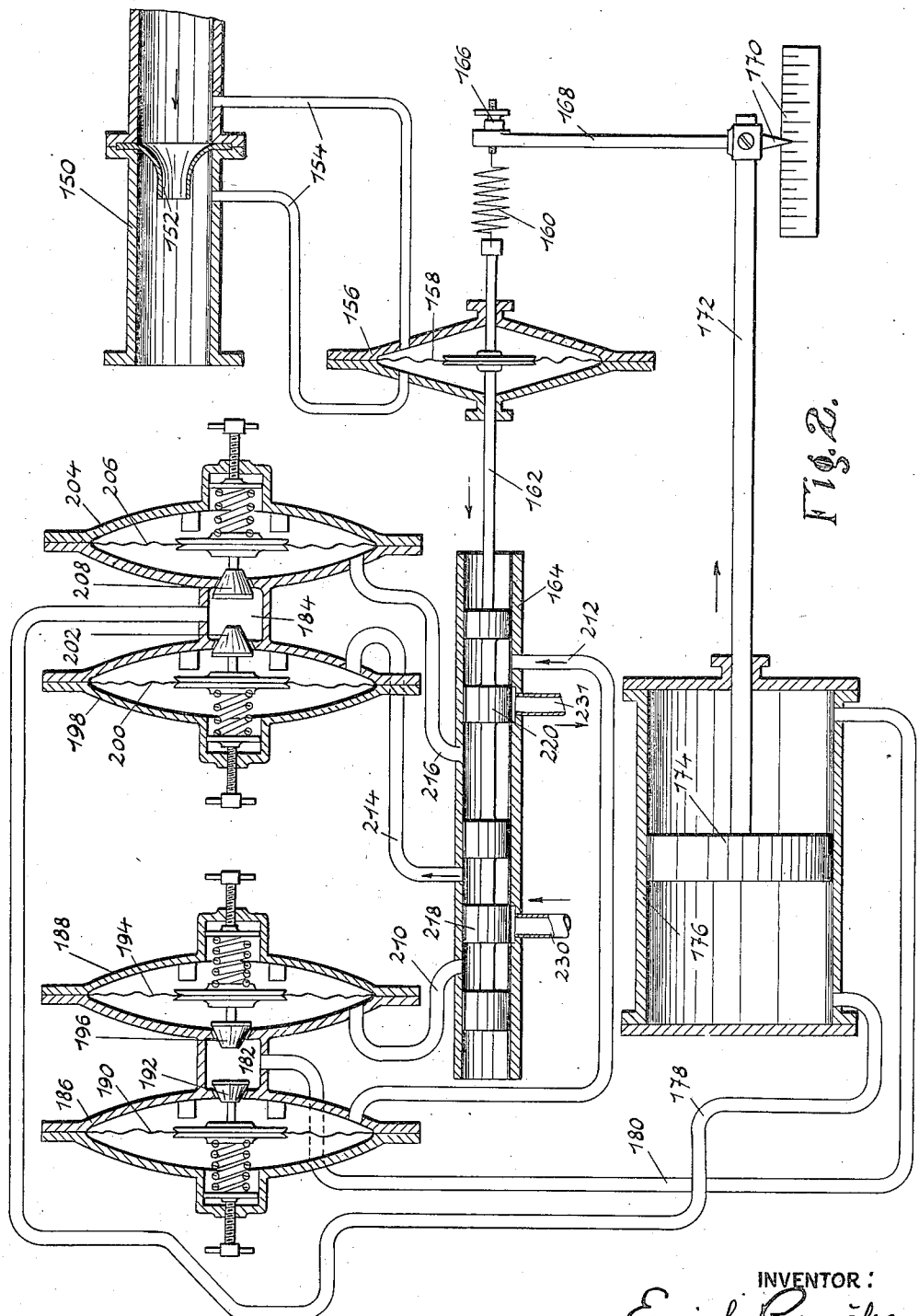

Referring to the accompanying drawings, in which like numerals of reference indicate the same parts throughout the several views, Figure 1 is a diagrammatic illustration of a system showing the use of my invention therewith;

Figure 2 is a diagrammatic illustration of a system for varying the position of a movable member by fluid pressure varied in accordance with variations in the physical or chemical quantity or quality, showing another form of my invention for controlling two variable fluid pressures.

For the purpose of illustrating the use of my invention, I have shown my invention in Figure 1 used in a system for varying auxiliary fluid pressure in accordance with variations in a physical or chemical quantity or quality. The auxiliary fluid under pressure flows from a supply pipe 2 through a governor valve comprising a cylinder 10 and valve piston 12 which is actuated in accordance with variations in the quantity or quality. In the present instance, the valve piston 12 is provided with a rod 14 having a pin and slot connection 30 with one arm of a bell crank lever 26 pivotally mounted on a fixed support as at 28, the other arm of which is pivotally connected to one end of a link 24 the other end of which is pivotally connected to one end of a lever 22. The other end of said lever 22 is pivotally connected to a bell 16 mounted in liquid in a container 18. The physical or chemical quantity or quality is in the form of a fluid and flows into the bell 16 through a pipe 20. With this construction the valve piston 12 is actuated by variations in the physical or chemical quantity or quality, in other words, the pressure or volume of fluid, through rising and falling of the bell 16 in the liquid in the container 18.

A piston 6 is mounted in a cylinder 4 and movable in one direction by fluid pressure and in the opposite direction by a spring 8. The fluid for actuating the piston 6 is derived from the pipe 2 and flows through the governor valve 10, 12. Fluid flow resisting means is interposed between the said governor valve and the cylinder 4 to maintain the pressure drop produced by actuation of the governor valve at a certain and extremely small magnitude. A pipe 38 has one end connected to the cylinder 10 of the governor valve and the other end connected to a diaphragm chamber 44 at one side of a diaphragm 48 mounted in a diaphragm casing 46. The diaphragm 48 carries an axial inlet flow resisting device or valve 56 which is adapted to control the flow of fluid from the pipe 38 through a pipe 36 to the cylinder 4. The pipe 2 is connected by a branch pipe 40 to the diaphragm casing 46 at the side opposite the pipe 38, and a spring 52 adjustable by a screw 54 is interposed between the diaphragm casing 46 and the diaphragm at the side of the diaphragm opposite the valve 56 to produce and adjust the drop or difference in pressure between the pipe 2 and the pipe 38. Stops 50 are provided on the casing 46 to limit movement of the diaphragm in the direction of opening of the valve 56, and a safety valve 82 is mounted in a casing 80 connected between the pipes 38 and 40 and influenced against the pressure in the pipe 40 by a spring 84 to prevent injury to the diaphragm 48.

An outlet flow resisting valve 70 is mounted on a diaphragm 64 carried by a diaphragm casing 60, said valve controlling communication through a chamber 58 between the pipe 36 and the diaphragm chamber 60 at the valve side of the diaphragm 64. The said chamber 60 is connected by a pipe 42 to a port in the governor valve cylinder 10. In accordance with my invention, a slight difference in pressure between the diaphragm chamber 60 and the chamber at the opposite side of the diaphragm 64 is maintained. In the present instance said difference in pressure is produced by a spring 66 interposed between the diaphragm 64 and an adjusting mechanism 68. Stops 72 are provided on the diaphragm casing to limit movement of the diaphragm in the direction of opening of the valve 70.

In the operation of the system, the bell 16 is moved in one direction by variations in the fluid pressure within the same. Assuming that the bell is moved in the direction indicated by the arrow, the valve piston 12 is actuated in the direction of the arrow and permits flow of fluid from the pipe 2 through the pipe 38 to the diaphragm chamber 44. The flow of fluid into said diaphragm chamber actuates the diaphragm to open the valve 56, and fluid thus flows through the chamber 58 and pipe 36 to the cylinder 4 behind the piston 6. The piston is thus moved in the direction indicated by the arrow, and in the present instance is connected by a rod 32 to the lever 22 intermediate its ends so as to return the valve piston 12 to its neutral or closed position. The flow of fluid through the pipe 38 is thus stopped, and the diaphragm 48 is actuated by the difference in pressure to close the valve 56. Upon actuation of the bell 16 in the opposite direction, the piston 12 is moved to open the port in the pipe 42 to permit the fluid pressure to flow from the chamber 60. The diaphragm 64 is then actuated to open the valve 70, and the fluid flows from the cylinder 4 through pipe 36 and chamber 60 into the atmosphere through pipe 42. The piston 6 is thus moved in the direction opposite to that above described by the spring 8 and returns the valve piston to its neutral or closed position. The pressure in pipe 36 is varied in accordance with and is a measure of the variations in the force actuating bell 16, and a pressure gauge 34 may be utilized to measure this pressure.

Assuming that the fluid pressure in pipe 2 is 200 pounds per square inch, the difference in pressure on the governing edges of the valve piston 12, that is the difference in pressure in the pipe 2 and the pipe 38, need be only 10 pounds. The pressure in the cylinder 4 may vary from 5 to 180 pounds per square inch. The flow resisting valve 56 thus has, according to the pressure in the cylinder 4, pressures from 185 pounds to 10 pounds to regulate or throttle. The above-mentioned differences in pressure on the governor valve are maintained certain and of a very small amount by the flow resisting means 56 and 70 actuated by the fluid flowing from the governor valve 10, 12 to the cylinder 4 and from cylinder 4 to the atmosphere. There is therefore very little friction and reaction of pressure on the valve piston 12, and the governor valve is thus easy of operation and is subjected to a minimum amount of wear. The flow of fluid through the governor valve 10, 12 is a function of the opening of the ports of the valve.

In the system shown in Figure 3 of the drawings, the piston 174 mounted in the cylinder 176 of the fluid motor is actuated in accordance with variations in the physical or chemical quantity or quality flowing through a conduit 150 having a flow resistance device 153 therein. Pipes 154 are connected to the conduit 150 at opposite sides of the flow resistance device 152 and to a diaphragm chamber 156 at opposite sides of a diaphragm 158, so that said diaphragm is sensitive or responsive to differences in pressure at opposite sides of the device 152. The diaphragm 158 has connected thereto a rod 162 carried by a double piston valve 218, 220, mounted in a cylinder 164 of a governor valve. The said governor valve controls the flow of fluid to and from the double-acting fluid motor 174, 176.

Two fluid flow resisting means similar to that shown in Figure 1 of the drawings are interposed between the governor valve 164, 218, 220 and the said fluid motor 174, 176 to maintain certain and small drops in pressure in the governor valve 164. Thus, inlet and outlet flow resisting valves 196 and 192 respectively, are provided for the right hand end of the cylinder 176, and inlet and outlet flow resisting valves 202 and 208 respectively, are provided for the left hand end of the cylinder 176. The valve 196 is carried by a diaphragm 194 mounted in a diaphragm casing 188, which is connected at the side of the diaphragm carrying the valve 196 to the cylinder 164 of the governor valve by a pipe 210. The valve 192 is carried by a diaphragm 190 mounted in a diaphragm casing 186 which is connected at the side of the diaphragm carrying the valve 192 to the cylinder 164 of the governor valve by a pipe 212. The said diaphragm casings 188 and 186 are connected by a chamber 182 which is connected to the cylinder 176 at the right hand end of the piston 174. The valves 202 and 208 are carried by the respective diaphragms 200 and 206 mounted in the respective diaphragm casings 198 and 204. The casing 198 at the side of the diaphragm 200 carrying the valve 202 is connected to the cylinder 164 of the governor valve by a pipe 214, and the diaphragm casing 204 at the side of the diaphragm 206 carrying the valve 208 is connected to the governor valve cylinder by a pipe 216. The two casings 198 and 204 are connected by a chamber 184 which is connected by a pipe 178 to the cylinder 176 at the left hand end of the piston 174. The valves 192, 196, 202 and 208 are actuated in one direction by fluid pressure flowing between the governor valve 164 and the motor 176 and in the other direction by springs similar to those shown in Figure 1 of the drawings.

In the operation of the system, the diaphragm 158 is actuated in one direction or the other by differences in pressure at opposite sides of the device 152. Assuming the diaphragm to be actuated in the direction indicated by the arrow, the governor valve piston 218, 220 will be moved in the direction of the arrow to permit flow of fluid from the supply pipe 230 through pipe 214 to the diaphragm casing 198. The diaphragm 200 is thus actuated against the spring to open the valve 202 and the fluid flows from the casing 198 through the chamber 184 and pipe 178 to the left hand end of the cylinder 176. At the same time fluid flows from the diaphragm casing 186 through pipe 212 and the governor valve cylinder 164 to the exhaust pipe 231, and the diaphragm 190 is actuated by its spring to open the valve 192. Fluid then flows from the right hand end of the cylinder 176 through pipe 180, chamber 182 and diaphragm chamber 186 to pipe 212 and exhaust pipe 231. The piston 174 is thus moved in the direction indicated by the arrow. To maintain the system in balanced condition, the piston 174 is provided with a rod 172 carrying a lateral arm 168 connected by a tension spring 166 to the diaphragm 158. The motion of the piston 174 varies the force of the spring 160 and thus balances the force actuating the diaphragm 158 so as to return the governor valve piston 218, 220 to its neutral or closed position. When the diaphragm 158 is actuated in the opposite direction the governor valve piston 218, 220 is moved to permit flow of fluid from the supply pipe 230 through pipe 210 to the diaphragm casing 188. The diaphragm 194 is thus actuated against its spring to open valve 196. The fluid then flows from the diaphragm casing through chamber 182 and pipe 180 to the right hand end of the cylinder 176. At the same time, fluid flows from the diaphragm casing 204 to the pipe 216 and the governor valve cylinder 164 to the outlet pipe 231. The diaphragm 206 is then actuated by its spring and opens valve 208. The fluid then flows from the left hand end of the cylinder 176 through pipe 178, chamber 184, diaphragm casing 204 and pipe 216 to the outlet pipe 231. The piston 174 is thus moved and varies the force of spring 160 so as to return the governor valve 218, 220 to its neutral or closed position.

With this system the variations in the flow of fluid through conduit 150 may be measured since the piston 174 is actuated in accordance with variations in said fluid flow. To indicate the flow of fluid, a pointer may be secured to the piston rod 172 to cooperate with a scale as indicated at 170. The devices 186, 188, 198 and 204 maintain a certain and low pressure drop on the valve piston 218, 220 with fluid flowing either to or from either end of the cylinder 176 so that the piston 218, 220 is sensitive and easy of operation by the diaphragm 158 and subjected to minimum wear. Also said devices 186, 188, 198 and 204 enable the governor valves 164 to vary the fluid flow independently of variations in pressure of the fluid at the supply 230 and reduce the back pressure on the governor valve.

While I have shown the system embodying mechanisms of certain detail constructions it will be understood that this is only for illustrating the principles of the invention, and that many modifications and changes in the detail mechanism may be made without departing from the spirit or scope of the invention. Also, while the means 46, 62, etc., are shown at the discharge side of the governor valve, they may be arranged at the inlet side. Therefore, I do not wish to be understood as restricting myself except as required by the following claims when construed in the light of the prior art.

Having thus described the invention, what I claim is:

1. A system of the character described, comprising a conduit for conducting fluid in a plurality of directions, a governor means for controlling flow of fluid in said plurality of directions, and a plurality of fluid flow resistance means controlled by fluid pressure flowing in said conduit to reduce and maintain a certain difference in pressure on said governor means caused by variations in the flow of fluid through the governor means in all of said directions.

2. A system of the character described, comprising means for producing movement of a movable member by fluid flow, a conduit for conducting fluid under pressure to and from said means, governor means for controlling the flow of fluid to and from the first-mentioned means, and fluid flow resistance means controlled by fluid pressure in said conduit to reduce and maintain a certain difference in pressure on said governor means caused by variations in the flow of fluid through the governor means to and from said first-mentioned means.

3. A system of the character described, comprising means to be actuated by fluid pressure, a conduit for conducting fluid to and from said means, governor means for controlling flow of fluid to and from the first-mentioned means, and a plurality of fluid flow resisting means one controlled by a certain difference in pressure at opposite sides of said governor means of the fluid flowing to said first-mentioned means and the other controlled by a certain difference in pressure at the opposite sides of the governor means of the fluid flowing from said first-mentioned means, whereby the variations in pressure on said governor means caused by variations in the flow of fluid are reduced.

4. A system of the character described, comprising means to be actuated by fluid pressure, a conduit for conducting fluid to and from said means, a governor valve having a port to permit flow of fluid to said means and another port to permit flow of fluid from said means whereby said governor valve controls flow of fluid to and from said means, and a plurality of fluid flow resistance means in said conduit, one controlled by a certain difference in pressure in fluid at opposite sides of the first-mentioned valve port to allow flow of fluid to said first-mentioned means and the other controlled by a certain difference in pressure of fluid at opposite sides of the second-mentioned port to allow fluid to flow from said first-mentioned means, whereby certain differences in pressures are maintained at opposite sides of both of said ports.

5. A system for varying the position of a movable member in accordance with variations in a variable condition, comprising means for producing movement of a movable member by fluid flow, a conduit for conducting fluid under pressure to and from said means, governor means for controlling the flow of fluid to and from the first-mentioned means, a fluid flow resistance means controlled by fluid pressure in said conduit to reduce and maintain a certain difference in pressure on said governor means caused by variations in the flow of fluid through the governor means to and from said first-mentioned means, and means actuated by said condition to cooperate with said first-mentioned means and said governor means to actuate said governor means in accordance with variations in said condition.

6. A system for varying the position of a movable member in accordance with variations in a condition, comprising means for producing movement of a movable member by fluid pressure, a conduit for conducting fluid to and from said means, governor means for controlling flow of fluid to and from the first-mentioned means, a plurality of fluid flow resisting means one controlled by a certain difference in pressure at opposite sides of said governor means of the fluid flowing to said first-mentioned means and the other controlled by a certain difference in pressure at the opposite sides of the governor means of the fluid flowing from said first-mentioned means, whereby the variations in pressure on said governor means caused by variations in the flow of fluid are reduced, and means actuated by said condition to cooperate with said first-mentioned means and said governor means to actuate said governor means in accordance with variations in said condition.

7. A system for varying fluid pressure according to variations in a variable condition, comprising means actuated by fluid pressure, governor means for varying the intensity of flow of fluid to said first-mentioned means, a fluid flow resistance means in said conduit controlled by a certain difference in the pressure of fluid at opposite sides of said governor means to reduce variations in pressure on said governor means caused by variations in the flow of fluid, and means actuated by said variable condition to cooperate with said first-mentioned means and said governor means to actuate the governor means in accordance with variations in said condition.

8. A system of the character described, comprising a source of fluid under pressure, a pipe for conducting fluid under pressure to and from a desired point, two fluid flow resistance means one to control flow of fluid through said pipe in one direction and the other to control flow of fluid through said pipe in the opposite direction, means sensitive to the pressure of the fluid flowing to said point to actuate one of said flow resistance means, means sensitive to the pressure of fluid flowing from said point to actuate the other of said flow resistance means, a governor for controlling flow of fluid in both of said directions, and means for influencing each of said sensitive means against the fluid pressure acting thereon to produce and maintain a certain difference in pressure on said governor with fluid flowing in either of said directions.

9. A system of the character described, comprising a source of fluid under pressure, a pipe for conducting fluid under pressure to and from a desired point, two other conduits each adapted to communicate with said pipe, two fluid flow resistance means each to control communication between said pipe and one of said two other conduits, a governor means for controlling flow of fluid through one of said other two conduits from said source to said point and through the other of said conduits from said point, means sensitive to pressure of the fluid in each of said conduits for actuating the corresponding flow resistance means, and means for influencing each of said sensitive means against the fluid pressure acting thereon to produce and maintain a certain difference in pressure on said governor with fluid flowing in either of said directions.

10. A fluid control system comprising a casing having a pair of chambers each containing a device sensitive to differences in pressure at opposite sides thereof, a fluid pressure inlet port in one of said chambers at one side of the corresponding sensitive device, a fluid pressure outlet port in the other chamber at one side of the corresponding sensitive device, a port common to both of said chambers and communicating therewith at the before-mentioned sides of the respective sensitive devices, a fluid flow resistance member carried by each of said sensitive means to control communication between the respective chambers and said common port, and means at the side of each of said sensitive devices opposite the respective inlet or outlet for yieldingly resisting movement of said sensitive means by said fluid pressure.

ERICH ROUČKA.